(12) United States Patent
Liu et al.

(10) Patent No.: US 11,626,650 B2
(45) Date of Patent: Apr. 11, 2023

(54) BATTERY CELL DESIGN FOR PREVENTING INTERNAL SHORT CIRCUITS FROM OCCURRING AND PROPAGATING

(71) Applicant: The Boeing Company, Chicago, IL (US)

(72) Inventors: Shengyi Liu, Sammamish, WA (US); John A. Trela, Seattle, WA (US); Kamiar J. Karimi, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 427 days.

(21) Appl. No.: 16/850,362

(22) Filed: Apr. 16, 2020

(65) Prior Publication Data

US 2020/0251712 A1    Aug. 6, 2020

Related U.S. Application Data

(62) Division of application No. 15/464,219, filed on Mar. 20, 2017, now Pat. No. 10,665,849.

(51) Int. Cl.
| | |
|---|---|
| *H01M 10/42* | (2006.01) |
| *H01M 10/48* | (2006.01) |
| *H01M 10/0525* | (2010.01) |
| *H01M 50/572* | (2021.01) |
| *H01M 50/581* | (2021.01) |

(52) U.S. Cl.
CPC ..... *H01M 50/572* (2021.01); *H01M 10/0525* (2013.01); *H01M 10/425* (2013.01); *H01M 10/4235* (2013.01); *H01M 10/482* (2013.01); *H01M 50/581* (2021.01); *H01M 2200/10* (2013.01); *H01M 2200/103* (2013.01)

(58) Field of Classification Search
CPC ........... H01M 50/572; H01M 10/0525; H01M 10/4235; H01M 10/425; H01M 10/482; H01M 50/581; H01M 2200/10; H01M 2200/103; H01M 50/586; H01M 10/4207; Y02E 60/10

See application file for complete search history.

(56) References Cited

U.S. PATENT DOCUMENTS

| | | | |
|---|---|---|---|
| 7,910,235 B2 | 3/2011 | Tsai | |
| 2010/0310940 A1 | 12/2010 | Kim | |
| 2011/0195299 A1* | 8/2011 | Hashimoto | H01M 10/0413 429/153 |
| 2013/0177785 A1 | 7/2013 | Hwang | |
| 2013/0307334 A1* | 11/2013 | Middleton | G01R 31/3842 307/31 |
| 2014/0014420 A1* | 1/2014 | Nakamura | H01M 50/20 180/65.1 |
| 2016/0164064 A1* | 6/2016 | Lahiri | H01M 4/64 429/61 |
| 2018/0269535 A1 | 9/2018 | Liu et al. | |
| 2018/2069463 | 9/2018 | Liu et al. | |
| 2019/0048485 A1 | 2/2019 | Prado | |

OTHER PUBLICATIONS

Energy Materials Center at Cornell, "Battery Anodes", Jan. 5, 2017, available via the Internet at web.archive.org/web/20170105180246/http://www.emc2.cornell.edu/content/view/battery-anodes.html (last visited on Mar. 20, 2017).
Wikimedia Foundation, "Lithium-ion Battery", Feb. 10, 2017, available via the Internet at en.wikipedia.org/w/index.php?title=Lithium-ion_battery&oldid=764663732 (last visited Mar. 20, 2017).
Resistor Guide, "PTC thermistor", Jan. 8, 2016, available via the Internet at web.archive.org/web/20160108180240/http://www.resistorguide.com/ptc-thermistor/ (last visited Dec. 6, 2017).
Wikimedia Foundation, "PTC Rubber", Sep. 8, 2017, available via the Internet at en.wikipedia.org/w/index.php?title=PTC_rubber&oldid=799617013 (last visited Oct. 30, 2017).
Wikimedia Foundation, "Thermistor", Oct. 11, 2017, available via the Internet at en.wikipedia.org/w/index.php?title=Thermistor&oldid=804813068 (last visited Oct. 30, 2017).

\* cited by examiner

*Primary Examiner* — Muhammad S Siddiquee
(74) *Attorney, Agent, or Firm* — McDonnell Boehnen Hulbert & Berghoff LLP

(57) ABSTRACT

A battery and related methods are described. The battery can include a plurality of battery cell segments. Each of the battery cell segments can include an anode segment, a cathode segment, and one or more current limiters. The one or more current limiters are configured to conditionally electrically isolate the battery cell segment based on an occurrence of a short circuit within the battery cell segment. The battery can be used to store electrical power and/or provide electrical power to a load.

20 Claims, 14 Drawing Sheets

1410 Store electrical power using a battery, the battery including: one or more cells, each cell including a plurality of battery cell segments, each battery cell segment including: an anode segment, a cathode segment, and one or more current limiters

1420 Conditionally electrically isolate a particular battery cell segment based on an occurrence of a short circuit within the particular battery cell segment

FIG. 14

1510 Provide electrical power to a load using a battery, the battery including: one or more cells, each cell including a plurality of battery cell segments, each battery cell segment including: an anode segment, a cathode segment, and one or more current limiters

1520 Conditionally electrically isolate a particular battery cell segment based on an occurrence of a short circuit within the particular battery cell segment

FIG. 15 high # BATTERY CELL DESIGN FOR PREVENTING INTERNAL SHORT CIRCUITS FROM OCCURRING AND PROPAGATING

CROSS REFERENCE TO RELATED APPLICATION

The present application is a divisional of and claims priority to U.S. application Ser. No. 15/464,219 filed on Mar. 20, 2017, the entire contents of which are herein incorporated by reference.

FIELD

The present disclosure generally relates to electrical batteries, and more particularly to methods and apparatus related to batteries that have a plurality of battery cell segments.

BACKGROUND

Batteries are used to store and provide electrical power for aircraft, ground vehicles, personal electronic devices, and other electrically-powered devices. A battery can have a positive terminal or electrode and a negative terminal or electrode. Then, a "load" or device that draws power from the battery, can be connected via electrical conductors, such as wires, electrical contacts, and/or cables, to the positive terminal and the negative terminal in an electrical circuit. The battery can then operate in a discharge mode while providing power to the load. To charge the battery, a source of electrical power can be electrically connected to the positive terminal and the negative terminal in an electrical circuit, and the battery can operate in a charge mode to "charge" or draw and store power from the source. In some applications, as batteries used in vehicular and electrical power systems, the battery can be connected to one or more devices that can act as both a load and a source of electrical power to the rest of the car. While the car is being started, the rest of the car can act as a load to draw power from the car battery. After the car has started, an alternator and/or regenerative braking system of the car can act as a source of electrical power to charge the battery.

In some cases, batteries can fail due to environmental conditions, faults in the construction and/or design of the battery, physical damage to the battery, and the (gradual) deterioration of chemicals by the battery to store and provide current. These faults can lead to electrical open circuits, where no power is provided to the circuit, and/or battery internal electrical short circuits, where a path of low electrical resistance within the battery is created. A short circuit can lead to an unexpectedly large amount of power being provided to a component of an electrical circuit, including but not limited to, a battery in the electrical circuit.

SUMMARY

In an example embodiment, a battery is described. The battery includes one or more cells. Each cell includes a plurality of battery cell segments. Each battery cell segment includes: an anode segment, a cathode segment, and one or more current limiters configured to conditionally electrically isolate the battery cell segment based on an occurrence of a short circuit within the battery cell segment.

In another example embodiment, a method is described. Electrical power is stored using a battery, where the battery includes one or more cells, where each cell includes a plurality of battery cell segments, and where each battery cell segment includes: an anode segment, a cathode segment, and one or more current limiters. A particular battery cell segment is conditionally electrically isolated based on an occurrence of a short circuit within the battery cell segment.

In a further example embodiment, a method is described. Electrical power is provided to a load using a battery, where the battery includes one or more cells, where each cell includes a plurality of battery cell segments, and where each battery cell segment includes: an anode segment, a cathode segment, and one or more current limiters. A particular battery cell segment is conditionally electrically isolated based on an occurrence of a short circuit within the battery cell segment.

It should be understood that the description provided in this summary section and elsewhere in this document is intended to illustrate aspects of the present disclosure by way of non-limiting example. Generally, the features, functions, components, and advantages that are discussed herein can be achieved independently in various embodiments or may be combined in yet other embodiments, further details of which are disclosed in the following description and the accompanying drawings.

BRIEF DESCRIPTION OF THE FIGURES

FIG. 14 is a flowchart of a method for storing electrical power using a battery, according to an example embodiment.

FIG. 15 is a flowchart of a method for providing electrical power using a battery, according to an example embodiment.

DETAILED DESCRIPTION

Figure 1:
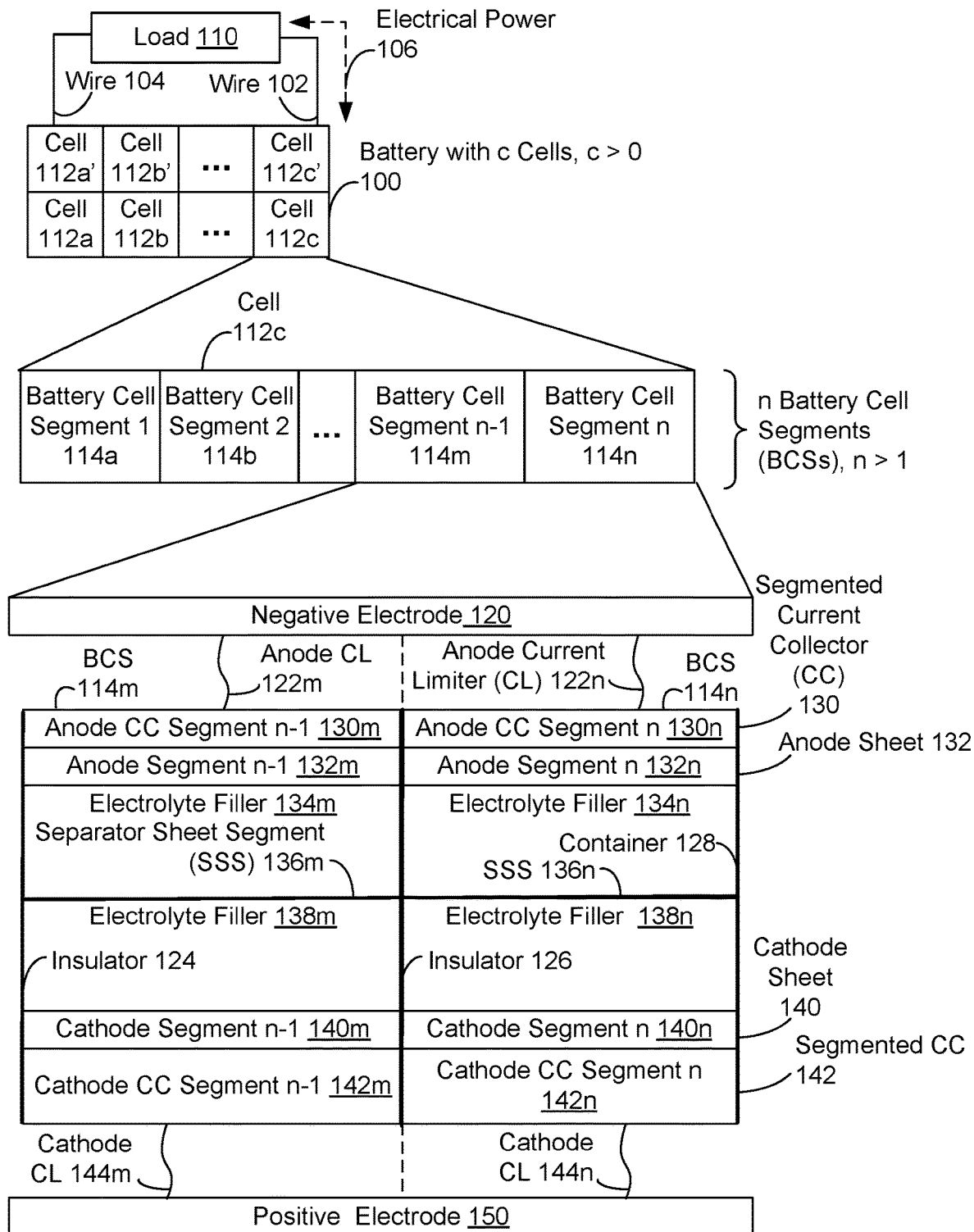
FIG. 1 is a block diagram of a battery and an electrical load, according to an example embodiment.

An internal short circuit may occur in a lithium ion battery cell. Such internal short circuits are difficult, if not impossible, to sense and managed externally and can cause damage to the entire battery. In some cases, internal short circuits can lead to battery fires, and the attendant risk to an environment proximate to the battery. In some examples, battery chemistry can be changed to reduce electrical activity of the battery and so reduce the risk of an internal short. The drawback of this approach is that it reduces the battery energy density, making batteries relatively larger.

To reduce these risks, a battery with one or more cells, each cell including a plurality of battery cell segments is described. Each battery cell segment is electrically isolated, and so the use of these battery cell segments provides a battery that can prevent and isolate a potential internal short circuit, thus keeping the battery safe and operational. Each battery cell segment is internal to the battery and/or a cell of the battery, and so no internal sensing is required. Rather, each battery cell segment has one or more current limiters that can detect a short circuit within the battery cell segment and consequently break an electrical circuit. Thus, a battery using battery circuits with current limiters enables automatic detection, location, and isolation of (potential) short circuits within the battery cell segment, keeping the remaining segments of the battery safe and operational.

More particularly, a battery cell segment of a battery can have an anode segment, a cathode segment, and one or more current limiters configured to conditionally electrically isolate the battery cell segment based on an occurrence of a short circuit within the battery cell segment. A current limiter of the one or more current limiters can be, or include, one or more electrical components that restrict current flow to a maximum amount. The current limiters can include a current limiter electrically connected to the anode segment and/or a current limiter electrically connected to the cathode segment.

A battery cell segment can include one or more insulators that electrically isolate the battery cell segment from one or more other battery cell segments and/or one or more current collectors. For example, an insulator of a battery cell segment can be shaped as an insulator strip whose thickness is based on the thickness of other layers of the battery; e.g., as thick as the total thickness of anode, cathode, separator, and electrolyte layers. A current collector can receive electrons from either the battery or from a circuit connected to the battery. For example, a battery cell segment can have an anode current collector electrically connected to the anode segment; and/or a cathode current collector electrically connected to the cathode segment.

Current collectors of a battery cell segment can be electrically connected to battery electrodes. For example, the anode current collector can also be electrically connected to a negative electrode for the battery, and/or the cathode current collector can also be electrically connected to a positive electrode for the battery. The battery electrodes can electrically connect multiple segments and/or cells of the battery.

A current limiter of a battery cell segment can electrically connect a current collector of a segment and a battery electrode; then, the current limiter can restrict an amount of current being provided from the battery cell segment (via the current collector) to the electrode or vice versa. In particular, a battery cell segment can have an anode current collector electrically connected to the anode sheet and an anode current limiter electrically connecting the anode current collector to a negative battery electrode and/or a cathode current collector electrically connected to the cathode sheet and a cathode current limiter electrically connecting the cathode current collector to a positive battery electrode Examples of segmented batteries include, but are not limited to, lithium ion batteries. Lithium ion batteries can have lithium in one or more anodes for releasing electrons; i.e., anode sheets and/or anode segments. The electrons released by the anode(s) can be received at cathode(s); i.e., cathode sheets and/or cathode segments, of these lithium ion batteries. In some cases, an electrolyte can be used as filler and aid transfer of ions between electrodes of the battery.

Battery cell segments can be used with a wide variety of battery chemistries, including but not limited to lithium-ion based battery chemistries. Examples of other battery chemistries, such as other high energy density batteries, can use other materials for anodes and/or cathodes than used in lithium ion batteries. Batteries using these other battery chemistries can be segmented using the same or similar techniques disclosed herein for segmenting batteries. Batteries of virtually any size can utilize battery cell segments, from relatively-small batteries, such as used in personal electronics and other applications, to relatively-large batteries used in vehicles, including aircraft, sea craft, and land vehicle and other applications. Thus, the use of segmented batteries can improve battery safety for a wide range of batteries and battery applications.

FIG. 1 is a block diagram of battery 100 and electrical load 110, according to an example embodiment. A top portion of FIG. 1 illustrates that battery 100 and electrical load 110 are connected via wires 102 and 104. Battery 100 can store electrical power and provide some or all of the stored power to electrical load 110 as electrical power 106 while battery 100 is operating in a discharge mode, as indicated by an arrow of electrical power 106 going from battery 100 to electrical load 110. In some examples, electrical load 110 can be replaced by and/or include a power source providing power to battery 100 operating in a charge mode, as indicated by an arrow of electrical power 106 going from electrical load 110 to battery 100.

Battery 100 can include c cells, c>0, that include cells 112a', 112a, 112b', 112b . . . 112c', 112c which can be connected in series and/or parallel. At least one of cells 112a', 112a, 112b', 112b . . . 112c', 112c, can include two or more battery cell segments (BCSs). For example, a upper-central portion of FIG. 1 shows cell 112c is made up of n battery cell segments, n>1, which include battery cell segments 114a, 114b . . . 114m, 114n. As such, battery 100 can include a plurality of battery cell segments; e.g., battery cell segments 114a, 114b, . . . 114m, 114n of cell 112c and battery cell segments in cells 112a', 112a, 112b', 112b, . . . (not shown in FIG. 1).

Battery cell segments 114a, 114b . . . 114m, 114n can be connected in parallel within cell 112c. In particular, battery cell segments and/or cells of battery 100 can be electrically connected in parallel to electrodes, such as negative electrode 120 and positive electrode 150. Electrodes 120 and 150 can conduct electrical current, and thereby conduct electrical power, from electrical load 110 to battery 100 operating in the charge mode or conduct electrical current/electrical power to electrical load 110 from battery 100 operating in the discharge mode. Power can be provided to and/or drawn from battery 100 as part of a circuit that electrically connects negative electrode 120 and positive electrode 150; e.g., a circuit including battery 100, wire 102 connecting battery 100 with electrical load 110, and wire 104 also connecting battery 100 with electrical load 110. A lower portion of FIG. 1 shows a top view of neighboring battery cell segments 114m and 114n. Battery cell segments 114m and 114n of cell 112c are both electrically connected to negative electrode 120 and positive electrode 150. Insulator 126 separates battery cell segments 114*m* and 114*n*, which, include respective anode current limiters (CLs) 122*m*, 122*n*, anode current collector (CC) segments 130*m*, 130*n*, anode segments 132*m*, 132*n*, electrolyte fillers 134*m*, 134*n*, separator sheet segments (SSSs) 136*m*, 136*n*, electrolyte fillers 138*m*, 138*n*, cathode segments 140*m*, 140*n*, cathode current collector segments 142*m*, 142*n*, and cathode current limiters 144*m*, 144*n*. In some examples, a battery cell segment can have only one current limiter. For example, battery cell segment 114*m* can include only anode current limiter 122*m* (or only cathode current limiter 144*m*) rather than both current limiters 122*m* and 144*m*.

Negative electrode 120 is electrically connected to respective battery cell segments 114*m*, 114*n* via respective anode current limiters 122*m*, 122*n*, which are also electrically connected to respective anode current collector segments 130*m*, 130*n*. Current limiters, such as current limiters 122*m*, 122*n*, 144*m*, and 144*n*, can include one or more electrical components that restrict current flow to a maximum amount. Example current limiters include, but are not limited to, a fuse, a positive temperature-efficient (PTC) current limiter, and a circuit breaker. A fuse can cause a battery cell segment to be completely electrically isolated if current passing through the fuse exceeds the fuse's current limit. A PTC current limiter can have an electrical resistance that increases as temperature of the PTC current limiter increases. As the electrical resistance of the PTC current limiter increases with temperature, the PTC current limiter can restrict current to a designated value, and so protect the battery cell segment. Also, the electrical resistance of the PTC current limiter can decrease as the temperature of the PTC current limiter decreases, so the PTC current limiter can continue functioning as a current limiting device. A circuit breaker can include an electrical switch, which can be opened to electrically isolate a battery cell segment if current passing through the current passing through the circuit breaker exceeds the circuit breaker's current limit.

A current limiter can conditionally isolate a battery cell segment when a fault condition, such as an internal short circuit, occurs that involves the battery cell segment. For example, if an internal short circuit occurs within battery cell segment 114*m*, then a relatively-large amount of current can flow through battery cell segment 114*m*. In this condition where an internal short circuit occurs, anode current limiter 122*m* and/or cathode current limiter 144*m* can conditionally electrically isolate battery cell segment 114*m*. Other examples of conditionally isolating battery cell segments using current limiters are possible as well.

Current collector segments 130*m*, 130*n*, 142*m*, 142*n* can receive electrons from battery 100 and provide the electrons to a circuit connecting battery 100 to electrical load 110, or vice versa. In some examples, some or all of current collector segments 130*m*, 130*n*, 142*m*, 142*n* can be electrically insulated from adjacent current collectors of other segments.

Anode current collector segments 130*m*, 130*n*, which are part of segmented current collector 130 and of respective battery cell segments 114*m*, 114*n*, are electrically connected to respective anode segments 132*m*, 132*n*. Respective anode segments 132*m*, 132*n* are separated by respective electrolytic filler 134*m*, 134*n*, separator sheet segments 136*m*, 136*n*, and electrolytic filler 138*m*, 138*n*, from respective cathode segments 140*m*, 140*n*. Electrolyte fillers 134*m*, 134*n*, 138*m*, 138*n* can aid transfer of ions between electrodes of the battery. Respective cathode segments 140*m*, 140*n* can be electrically connected to respective cathode current collector segments 142*m*, 142*n*. Cathode current collector segments 142*m*, 142*n* are electrically connected to respective cathode current limiters 144*m*, 144*n*, which also electrically connect respective battery cell segments 114*m*, 114*n* to positive electrode 150.

An insulator of battery 100 can chemically insulate and/or electrically insulate, or resist current flow, between components of battery 100. As examples, insulators 124 and 126 electrically insulate battery cell segment 114*m* from adjacent battery cell segments; e.g., insulator sheet 126 electrically insulates battery cell segment 114*m* from battery cell segment 114*n*. Other components of battery 100 can act as insulators; e.g., container 128 can electrically insulate and otherwise protect battery cell segment 114*n* from an environment outside battery 100.

Separator sheet segments 136*m*, 136*n* can be made of one or more separator materials and provide some protection from a circuit being formed between an anode segment and a cathode segment of a battery cell segment while allowing ion flow within battery 100. However, if either of separator sheet segments 136*m*, 136*n* fails to prevent formation of a short circuit between a respective anode segment 132*m*, 132*n* and respective cathode segment 140*m*, 140*n*, respective anode current limiters 122*m*, 122*n* and/or respective cathode current limiters 144*m*, 144*n* of respective battery cell segments 114*m*, 114*n* can limit the amount of current provided by a now-short-circuited battery cell segment.

In some examples, battery 100 can be a lithium ion battery. In these lithium-ion examples, anodes, such as anode segments 132*m*, 132*n*, can be made of one or more anode materials such as an intercalated lithium compound including, but not limited to, lithium cobalt oxide, lithium iron phosphate, lithium manganese oxide, and lithium nickel manganese cobalt oxide, and perhaps other materials; e.g., carbonaceous materials including graphite, copper foil, tin, misch metal alloys. Other lithium batteries can use metallic lithium as an anode material. In these lithium-ion examples, cathodes, such as cathode segments 140*m*, 140*n* can be made of one or more cathode materials including, but not limited to, manganese dioxide, carbon monofluoride, iron disulfide, thionyl chloride, bromine chloride, sulfur dioxide, sulfuryl chloride, and carbon. Also, in these lithium-ion examples, example materials used as electrolyte fillers include, but are not limited to, one or more of lithium perchlorate, propylene carbonate, dimethoxyethane, lithium tetrafluoroborate, gamma butroactone, dioxolane, dimethoxyethane, lithium tetracholoraluminate, thionyl chloride, lithium bromide, sulfur dioxide, and acetonitrile. In other examples, different anode, electrolyte, and/or cathode materials can be used in lithium ion batteries.

Insulators of battery 100, such as insulators 124, 126, can be made up of one or more electrically insulating materials, including but not limited to, polyvinyl chloride, polyethylene terephthalate, polypropylene, tetrafluoroethylene, polyolefin, ceramics, cotton, nylon, polyester, glass, wood, and wood products, such as cardboard or paper. Other insulator sheets and/or materials are possible as well. Separators of battery 100, such as separator sheet segments 136*m*, 136*n*, can be made of separator materials, where separator materials can be the same materials as the above-mentioned electrically insulating materials.

In designing battery 100, a minimum number of battery cell segments per cell can be determined. Consider that the maximum allowed current of a segment is $I_{max}$ for a duration of time $\tau$, beyond which the segment may be subject to an accelerated thermal degradation or damage, where values of and $\tau$ for a specific battery can be determined experimentally according to the specific battery's chemistry. Then, if a cell capacity is C, a minimum number n of battery cell segments of a cell can be determined using the following equation:

$$n = \frac{C}{I_{max}\tau}.$$

$I_{max}$ and/or $\tau$ can also be used in selecting a current limiter for each segment.

Figure 2:
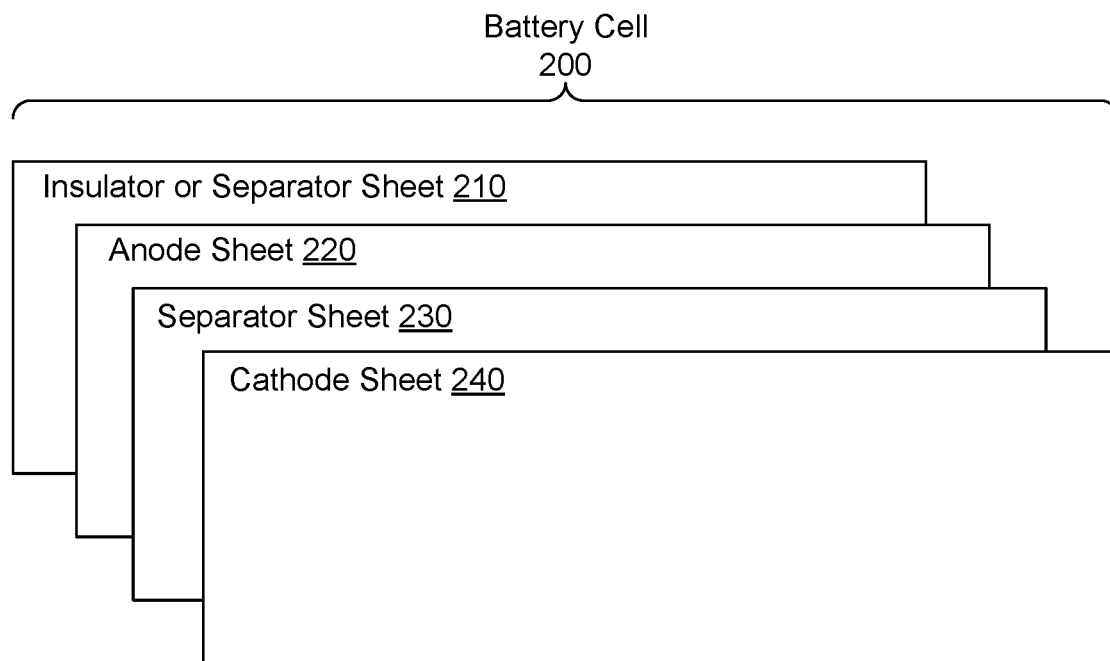
FIG. 2 is a block diagram of a conventional battery cell.

FIG. 2 is a block diagram of conventional battery cell 200. Battery cell 200 includes stacked sheets 210, 220, 230, and 240, which can be wrapped into cylinders to make cylindrical cells or folded into rectangular blocks to make prismatic cells. Battery cell 200 can include insulator or separator sheet 210 which can be made of one or more electrically insulating materials, anode sheet 220 which can be made of one or more anode materials, separator sheet 230 which can be made of one or more separator materials, and cathode sheet 240 which can be made of one or more cathode materials. Example electrically insulating materials, anode materials, separator materials, and cathode materials are listed above in the context of FIG. 1. In battery cell 200, insulator or separator sheet 210 can protect battery cell 200 from an environment outside the battery, anode sheet 220 can act as an anode, cathode sheet 240 can act as a cathode, and separator sheet 230 can provide some protection from a circuit being formed between anode sheet 220 and cathode sheet 240 while allowing ion flow within battery cell 200.

In batteries 100 and 200, insulators and separators differ, as insulators do not permit lithium ion flow, while separators do permit lithium ion flow. Taking as an example battery 200, if insulator or separator sheet 210 was not present in battery 200, and if sheets 220, 230, and 240 were wrapped from left to right, anode sheet 220 could touch cathode sheet 240, and then battery 200 would not operate. If insulator or separator sheet 210 is present as a separator sheet, and if sheets 210, 220, 230, and 240 were wrapped from left to right to form battery 200, the cathode and anode layers will have separators on its inner and outer sides, leading to a workable battery having a double-sided reaction. If insulator or separator sheet 210 is present as an insulator sheet, and if sheets 210, 220, 230, and 240 were wrapped from left to right to form battery 200, then each of anode sheet 220 and cathode sheet 240 has a separator layer on one side and an insulator layer on the other side, avoiding double-sided reactions.

Figure 3:
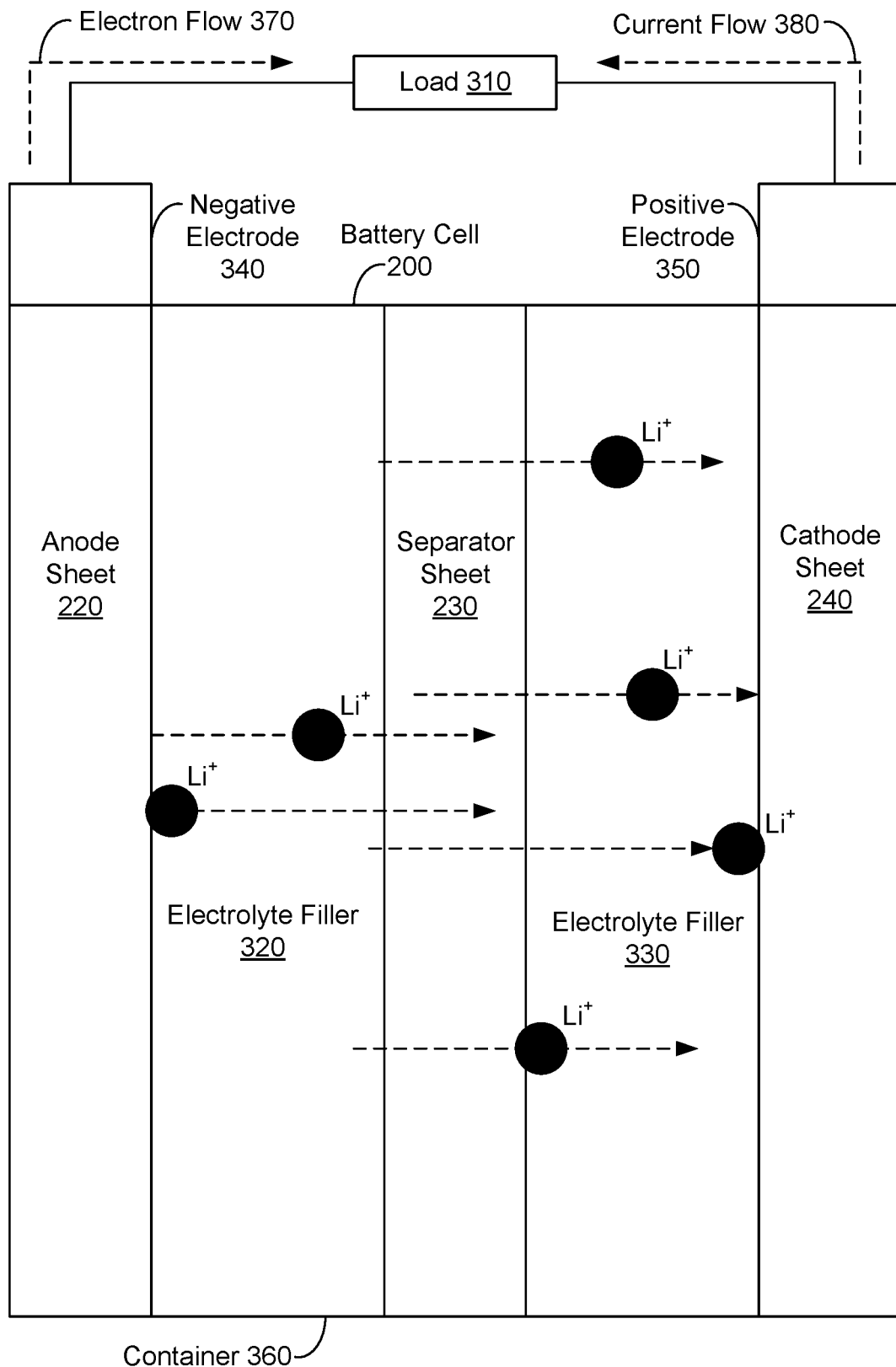
FIG. 3 is a diagram of the battery cell of FIG. 2 providing current to an electrical load.

FIG. 3 is a diagram of battery cell 200 providing current flow 380 to an electrical load 110. As battery cell 200 is providing current (as current flow 380) to electrical load 310, battery cell 200 can be considered to be in a discharge mode. While in the discharge mode, lithium ions (Li+) shown as black circles in FIG. 3, flow from anode sheet 220 through electrolyte filler 320, separator sheet 230, and electrolyte filler 330 to cathode sheet 240; that is, from left to right as shown in FIG. 3.

Battery cell 200 can include two electrodes; a negative electrode 340 which can be a source of electron flow 370 from battery cell 200 toward electrical load 310 while battery cell 200 is in the discharge mode, and a positive electrode 350 which can be a source of current flow 380 from battery cell 200 toward electrical load 310 while battery cell 200 is in the discharge mode. Battery cell 200 can also include container 360 to provide protection from an environment outside the battery.

Battery cell 200 can be in a discharge mode, as mentioned above, or in a charge mode. When battery cell 200 is in the charge mode, lithium ions of battery cell 200 move in an opposite direction from cathode sheet 240 to anode sheet 220 than shown in FIG. 3; that is, the lithium ions from right to left in FIG. 3. When battery cell 200 is in the charge mode, current flow 380 reverses its flow direction in comparison to when battery cell 200 is in the discharge mode.

Figure 4:
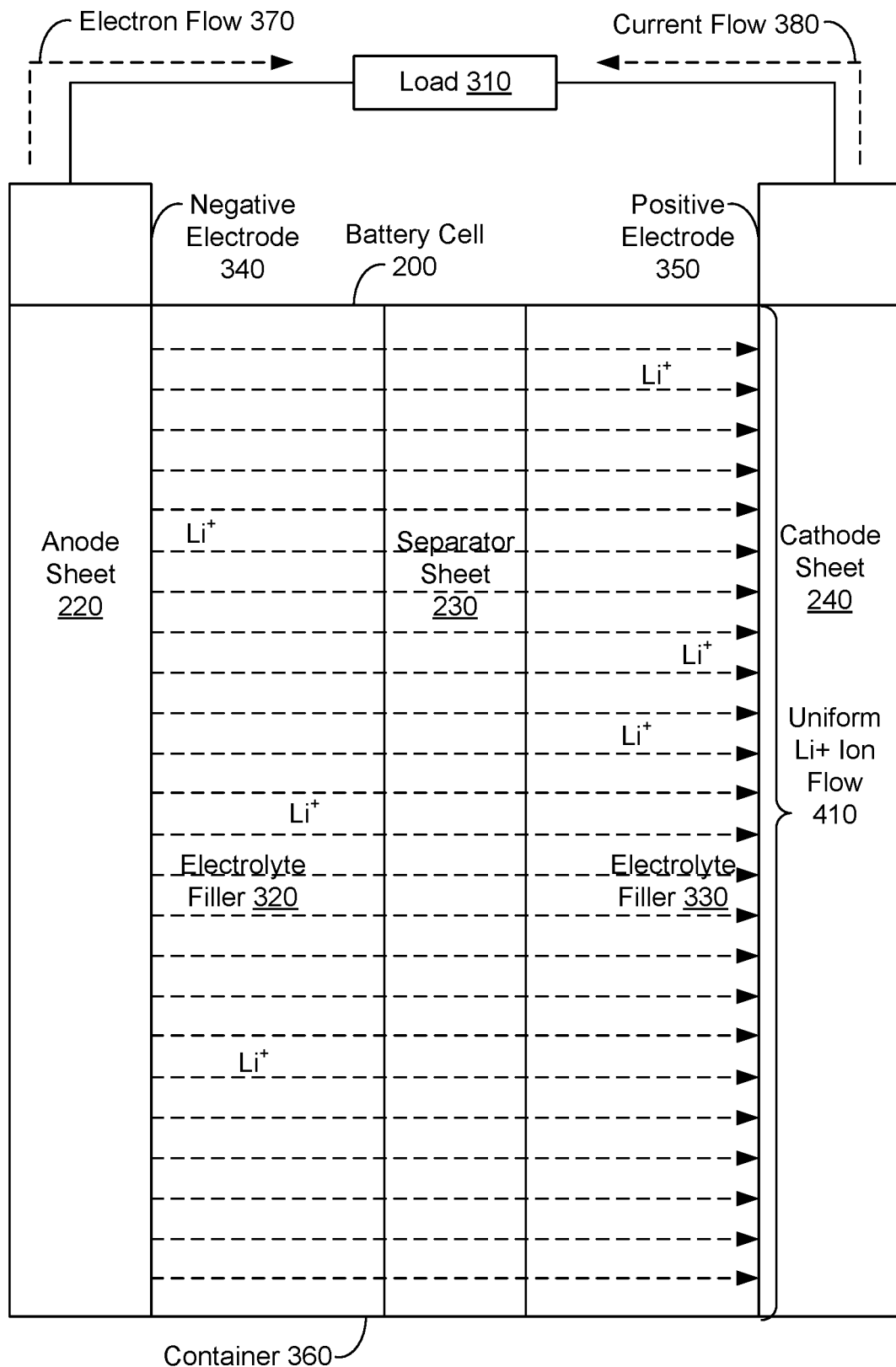
FIG. 4 is a diagram of the battery cell of FIG. 2 providing current to the electrical load based on a uniform ion flow.

FIG. 4 is a diagram of battery cell 200 providing current flow 380 to electrical load 310 based on a uniform lithium ion flow 410. In a normal condition of battery cell 200 operating in the discharge mode, a uniform lithium ion flow 410 travels from left to right in FIG. 4 from anode sheet 220, across electrolyte filler 320, separator sheet 230, and electrolyte filler 330 to arrive at cathode sheet 240. In a normal condition of battery cell 200 operating in the charge mode, uniform lithium ion flow 410 is reversed; that is uniform lithium ion flow 410 travels from right to left in FIG. 4.

Figure 5:
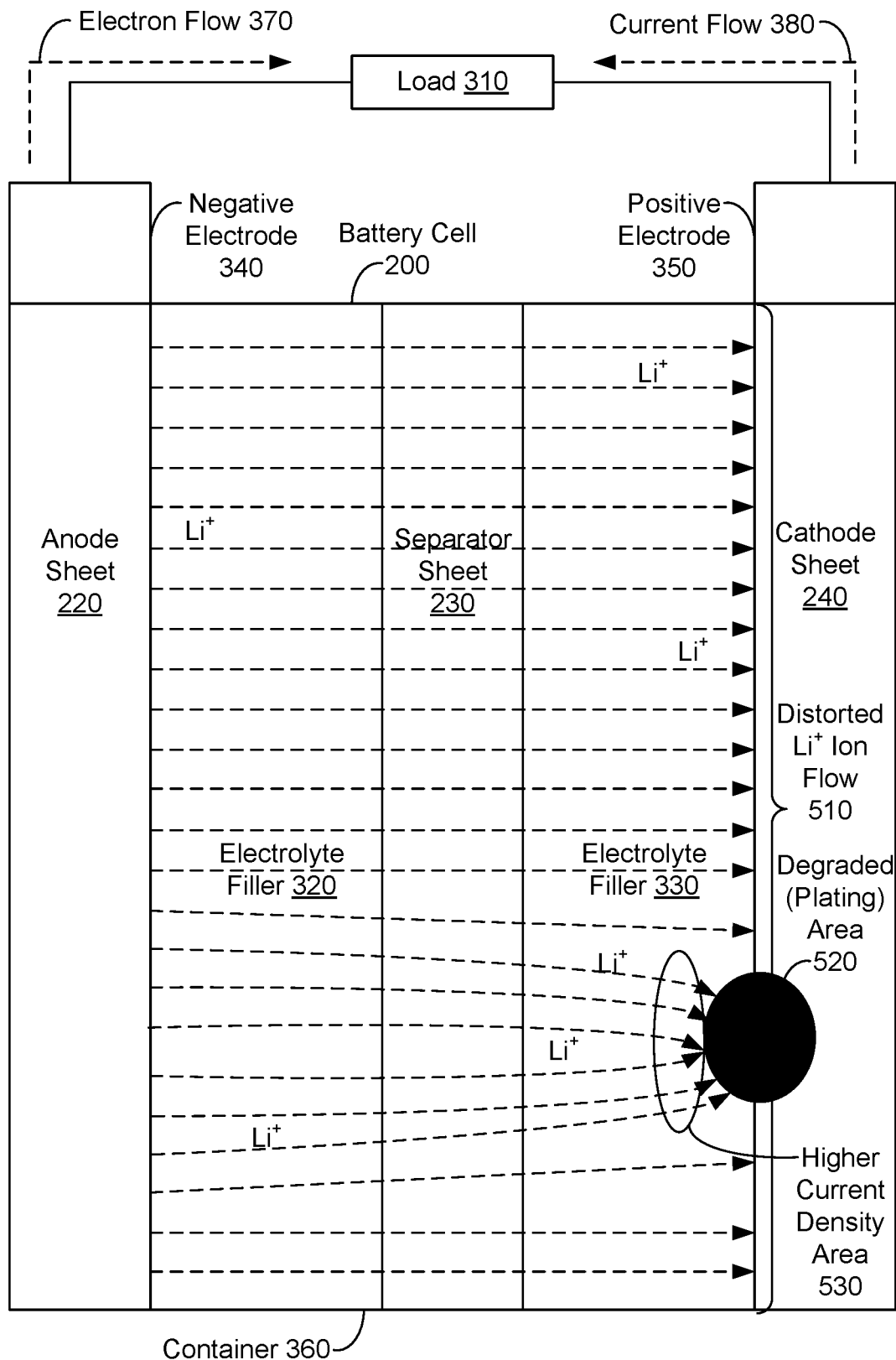
FIG. 5 is a diagram of the battery cell of FIG. 2 providing current to the electrical load based on a degraded ion flow.

FIG. 5 is a diagram of battery cell 200 providing current flow 380 to electrical load 310 based on distorted lithium ion flow 510. When battery cell 200 is operating in a discharge mode, faults can occur that distort a uniform lithium ion flow. One such fault is a degradation mechanism involving lithium plating in degraded area 520. If lithium plating does occur in degraded area 520 of battery cell 200 as shown in FIG. 5, the lithium plating can result in distorted lithium ion flow 510 from anode sheet 220 to cathode sheet 240 via separator sheet 230 and electrolyte fillers 320, 330. Distorted lithium ion flow 510 can cause local maxima of current density, such as higher current density area 530 at the intersection of distorted lithium ion flow 510 and degraded area 520.

Figure 6:
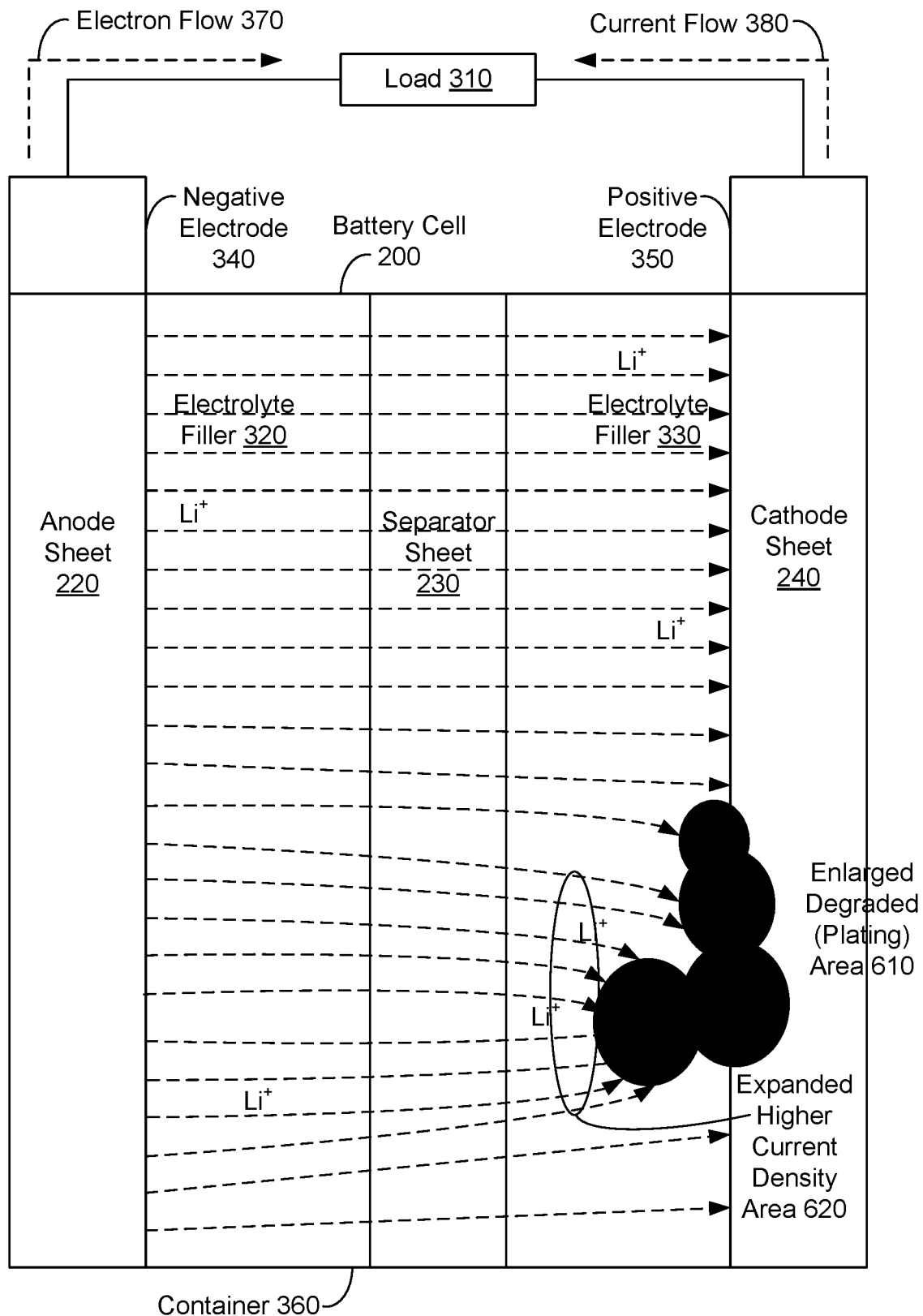
FIG. 6 is a diagram of the battery cell of FIG. 2 having an enlarged degraded area.

FIG. 6 is a diagram of battery cell 200 having an enlarged degraded area 610. If the lithium plating mentioned in the context of FIG. 4 increases, an enlarged degraded area can occur in battery cell 200. For example, if battery cell 200 endures prolonged exposure to relatively-high heat, a result in distorted flow of lithium ions across electrodes 340, 350, separator sheet 230, and electrolyte fillers 320, 330 can expand. Then, degraded area 520 of FIG. 5 can grow to become enlarged degraded area 610 of FIG. 6. As enlarged degraded area 610 expands, higher current density area 530 of FIG. 5 can expand to become expanded higher current density area 620 as well.

Figure 7:
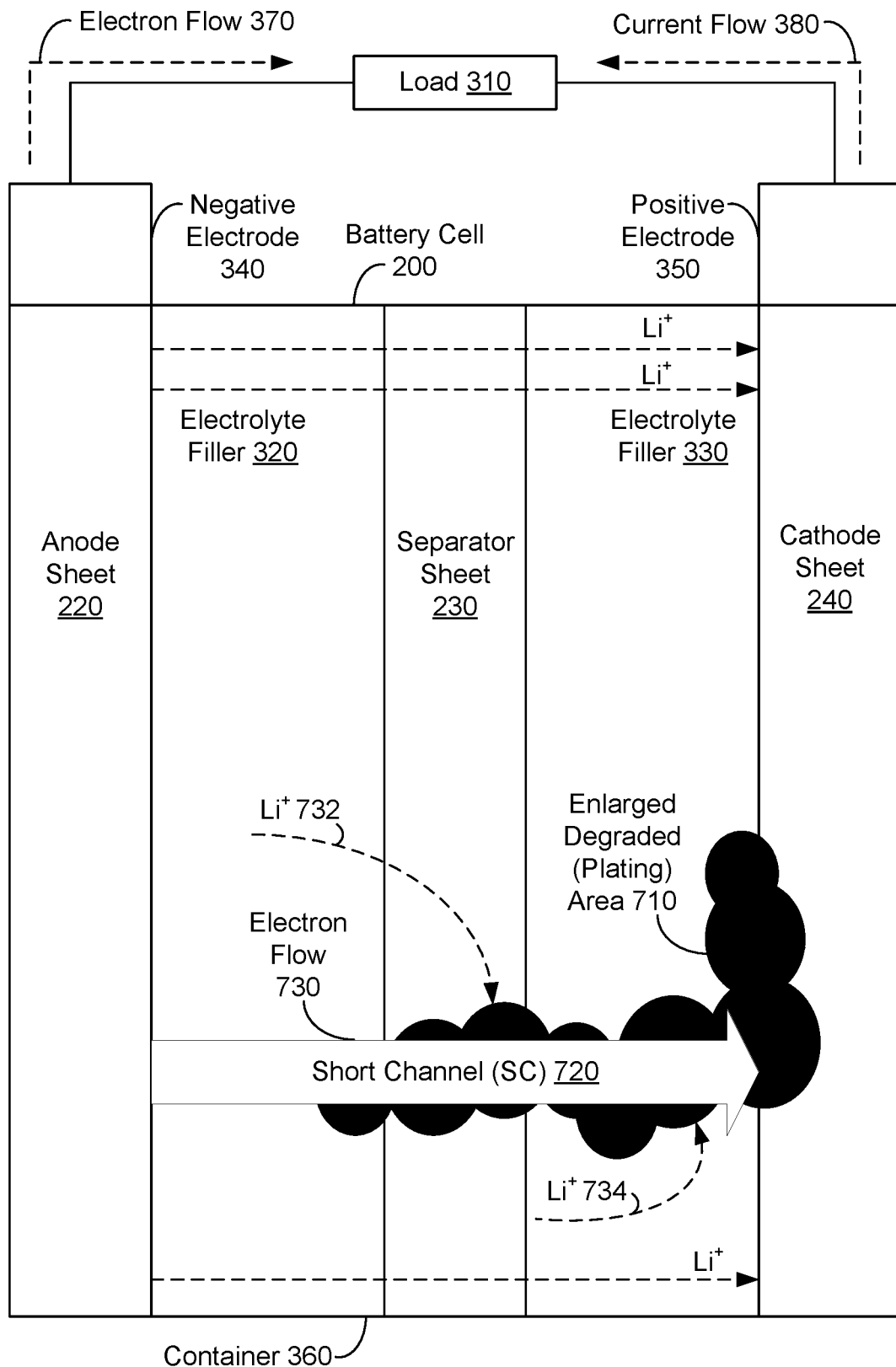
FIG. 7 is a diagram of the battery cell of FIG. 2 having a short channel in an enlarged degraded area.

FIG. 7 is a diagram of battery cell 200 having short channel (SC) 720 in enlarged degraded area 710. If enlarged degraded area 610 continues to grow; i.e., battery cell 200 continues to be exposed to relatively-high heat, to become enlarged degraded area 710, then enlarged degraded area 710 can eventually bridge anode sheet 220 and cathode sheet 240, resulting in short channel 720 through enlarged degraded area 710.

Short channel 720 can form a closed current loop with electron flow 730 within battery cell 200. Once short channel 720 forms and electron flow 730 begins, relatively-few electrons can flow as electron flow 370 to electrical load 310. Also, some electrons in electron flow 730 within short channel 720 can be neutralized by lithium ions 732, 734 attracted from electrolyte fillers 320, 330 to enlarged degraded area 710. The actual number of electrons in electron flow 730 to electrical load 310 can depend on the electrical resistance of short channel 720 and the electrical resistance of electrical load 310. Thus, an internal short circuit, such as short channel 720, can be difficult to detect using a sensing circuit that is external to (i.e., outside of) battery cell 200.

Figure 8:
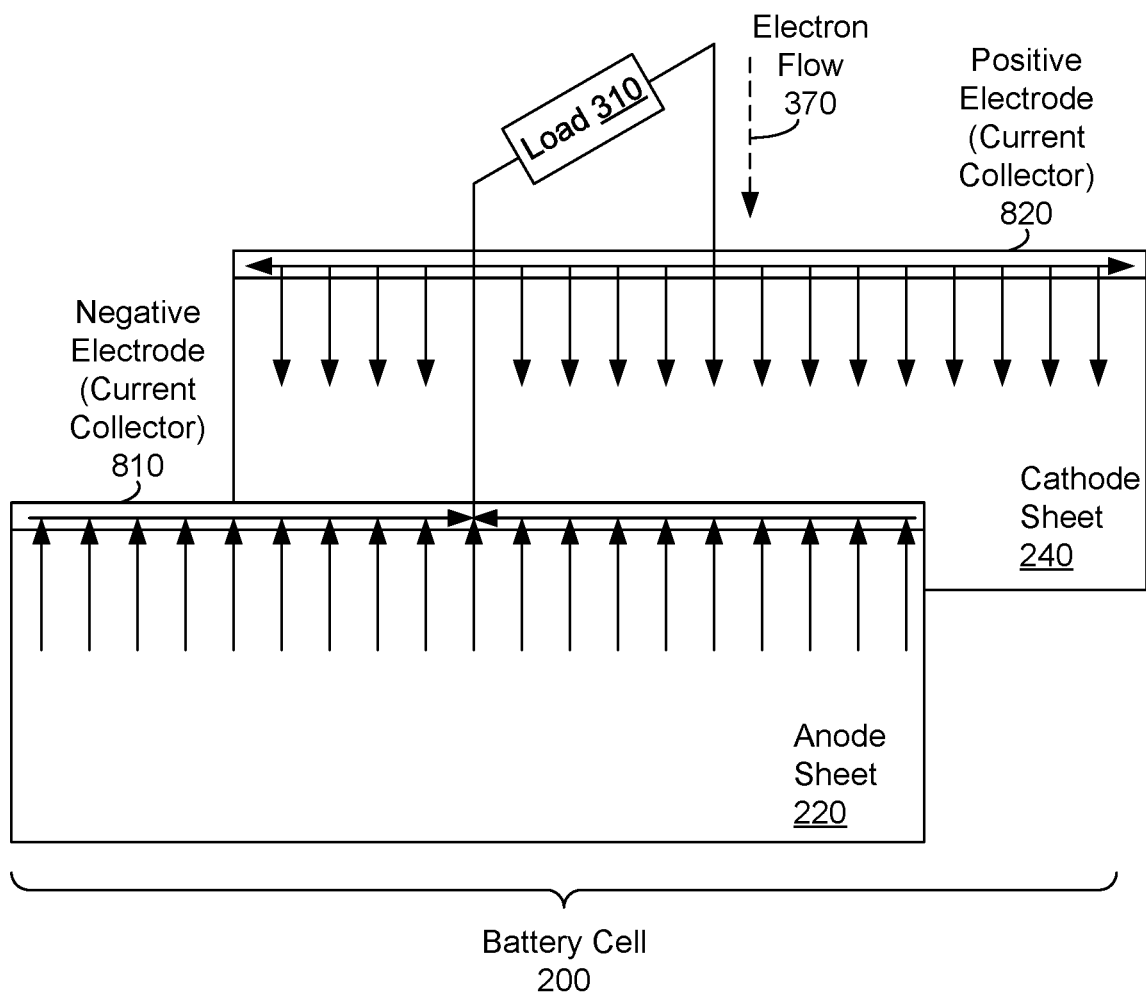
FIG. 8 is a diagram of anode and cathode sheets of the battery cell of FIG. 2 providing an electron flow to the electrical load while operating in a normal discharge mode.

FIG. 8 is a diagram of anode sheet 220 and cathode sheet 240 of battery cell 200 providing electron flow 370 to electrical load 310 while battery cell 200 is operating in a normal discharge mode. In the normal discharge mode, electrons can be collected at negative electrode 810, which can act as a current collector, from anode sheet 220 of battery cell 200. The electrons can flow as electron flow 730 through electrical load 310 to positive electrode 820, which can act as a current collector. Electrons arriving at positive electrode 820 can be uniformly distributed across cathode sheet 240. In the discharge mode, lithium ion flow (not shown in FIG. 8) can start at anode sheet 220, continue across a separator sheet, such as separator sheet 230, and arrive at cathode sheet 240.

Figure 9:
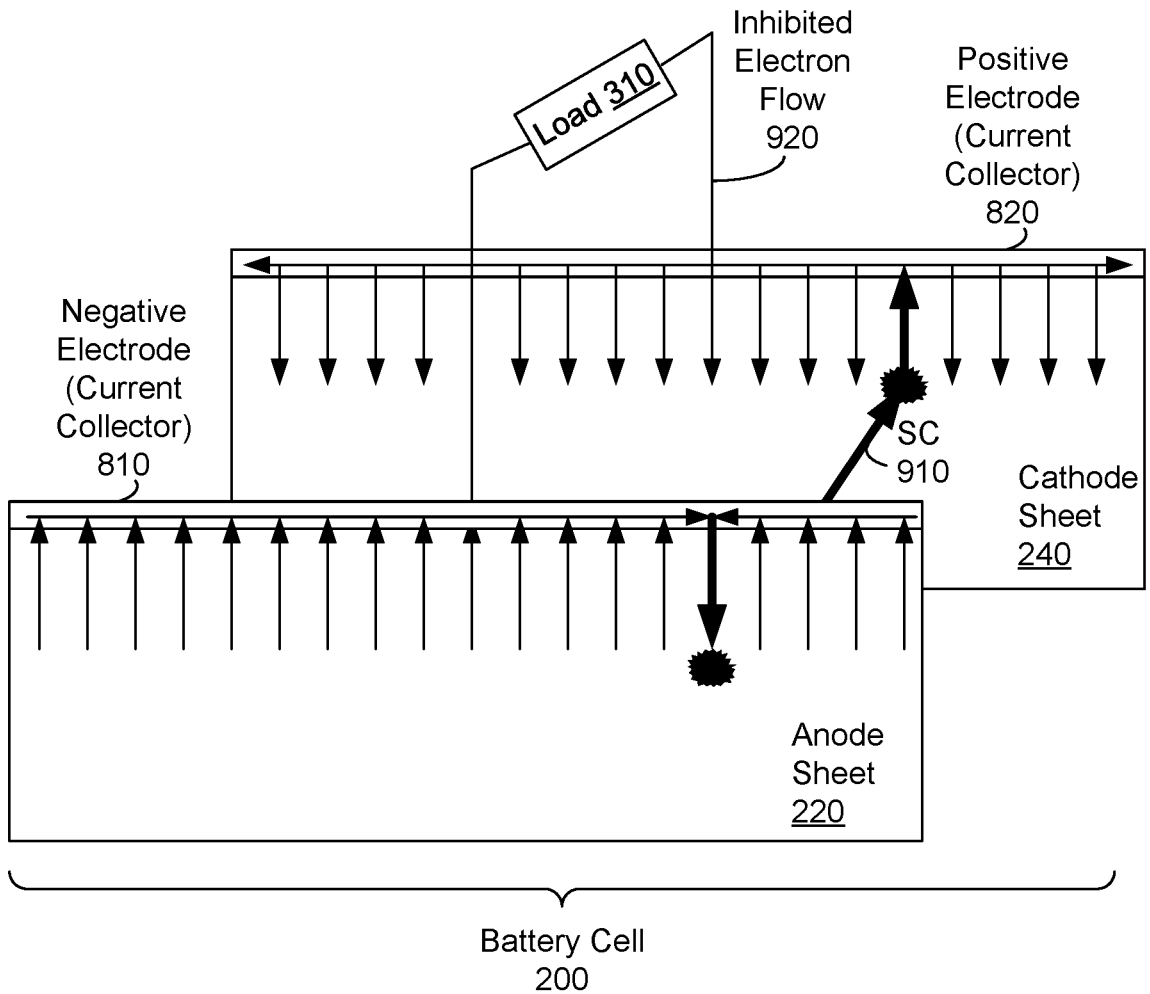
FIG. 9 is a diagram of the anode and cathode sheets of the battery cell of FIG. 2 having a short channel.

FIG. 9 is diagram of anode sheet 220 and cathode sheet 240 of battery cell 200, when battery cell 200 has short channel 910. In a discharge mode with an internal short circuit such as short channel 910, electrons can be collected at negative electrode 810 from anode sheet 220 of battery cell 200, just as when battery cell 200 is in a normal discharge mode. However, when battery cell 200 has an internal short circuit, electrons can flow via short channel 910 to cathode sheet 240 instead of flowing to electrical load 310, leading to inhibited electron flow 920 through electrical load 310. The electrons arriving at cathode sheet 240 can be collected at positive electrode 820 and distributed throughout cathode sheet 240, as indicated by the arrows from short channel 910 to cathode sheet 240 and through positive electrode 820. Typically, electrical resistance through short channel 910 is much less than an electrical resistance through electrical load 310, and so most, if not all, electrons flow through short channel 910 rather than flow through electrical load 310, leading to inhibited electron flow 920.

Figure 10:
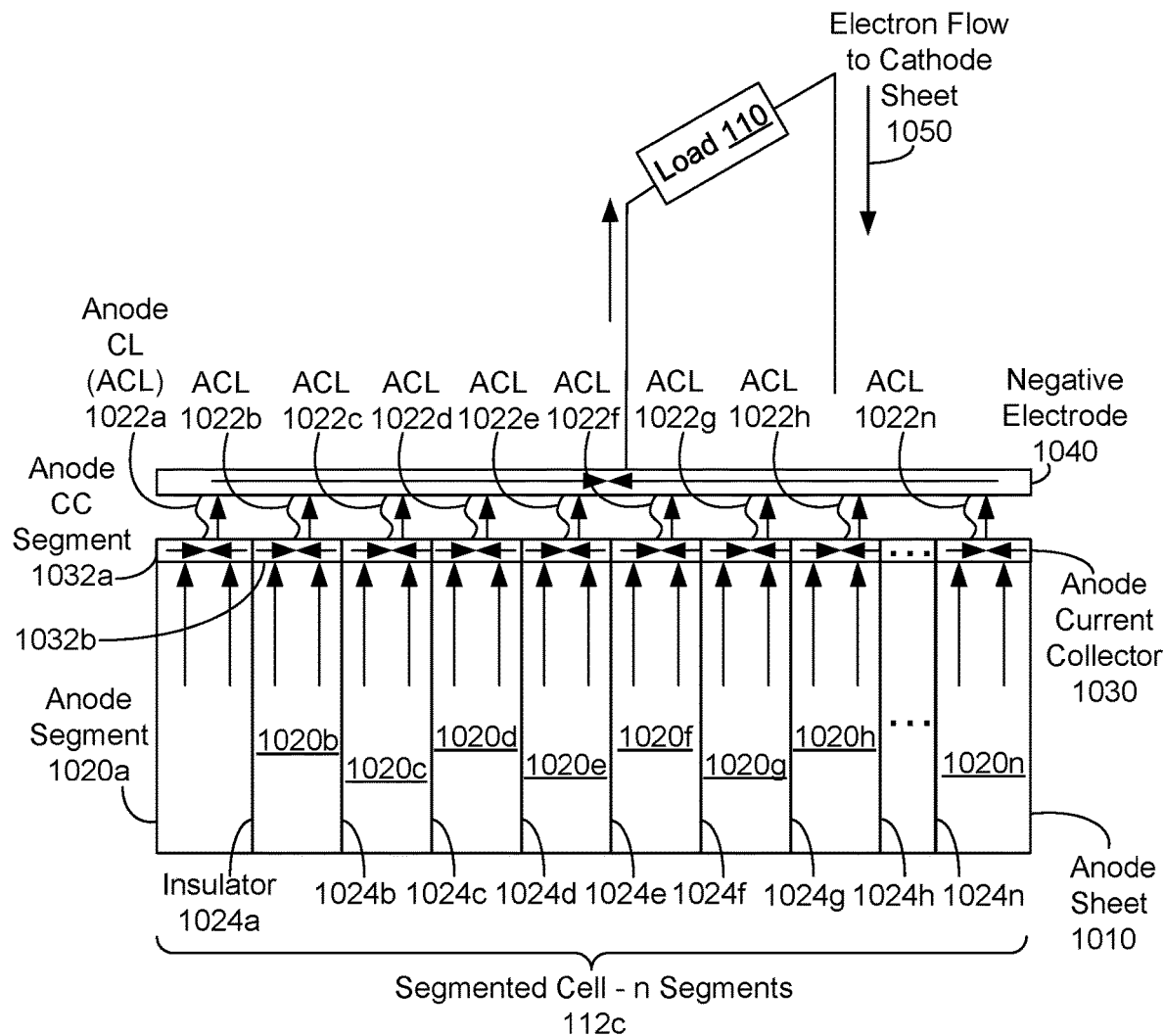
FIG. 10 is a diagram of a segmented anode sheet and a negative electrode of a battery cell of the battery of FIG. 1, according to an example embodiment.

FIG. 10 is a diagram of segmented anode sheet 1010 and negative electrode 1040 of battery cell 112*c* of battery 100, according to an example embodiment. As indicated in FIGS. 1 and 10-13, battery cell 112*c* is a segmented battery cell having n battery cell segments, n>1. In FIG. 10, the segments of anode sheet 1010 are shown as anode segments 1020*a*, 1020*b*, 1020*c*, 1020*d*, 1020*e*, 1020*f*, 1020*g*, 1020*h* . . . 1020*n*. The anode segments are electrically insulated from each other by insulators 1024*a*, 1024*b*, 1024*c*, 1024*d*, 1024*e*, 1024*f*, 1024*g*, 1024*h* . . . 1024*n*. For example, anode segment 1020*b* is electrically insulated from anode segment 1020*a* by insulator 1024*a* and is electrically insulated from anode segment 1020*c* by insulator 1024*b*.

Anode segments 1020*a*, 1020*b*, 1020*c*, 1020*d*, 1020*e*, 1020*f*, 1020*g*, 1020*h* . . . 1020*n* are connected to anode current collector 1030, which is segmented so that each segment of anode current collector 1030 is connected to a corresponding segment of anode sheet 1010. Further, each segment of anode current collector 1030 is both electrically isolated from other anode current collector segments and connected to negative electrode 1040 via an anode current limiter (ACL). For example, FIG. 10 shows that: anode segment 1020*a* of anode sheet 1010 is connected to anode current collector segment 1032*a* of anode current collector 1030, anode current collector segment 1032*a* is also connected to anode current limiter 1022*a*, and anode current limiter 1022*a* is also connected to negative electrode 1040. FIG. 10 also shows that each segment of anode current collector 1030 is electrically insulated from other anode current collector segments by insulators 1024*a*, 1024*b*, 1024*c*, 1024*d*, 1024*e*, 1024*f*, 1024*g*, 1024*h* . . . 1024*n*; e.g., anode current collector segment 1032*a* is separated by insulator 1024*a* from adjacent anode current collector segment 1032*b*.

When battery 100 is in a normal discharge mode, electrons are collected at segmented anode current collector 1030 from anode segments 1020*a*, 1020*b*, 1020*c*, 1020*d*, 1020*e*, 1020*f*, 1020*g*, 1020*h* . . . 1020*n* of anode sheet 1010. The collected electrons flow from segmented anode current collector 1030 through anode current limiters 1022*a*, 1022*b*, 1022*c*, 1022*d*, 1022*e*, 1022*f*, 1022*g*, 1022*h*, . . . 1022*n* to negative electrode 1040. These electron flows are illustrated in FIG. 10 by arrows from anode sheet 1010 to anode current collector 1030, arrows from anode current collector 1030 through anode current limiters 1022*a* . . . 1022*n* to negative electrode 1040. The electrons then flow from negative electrode 1040 to electrical load 110 and then as electron flow 1050 to a cathode sheet, which is shown in FIG. 11.

Figure 11:
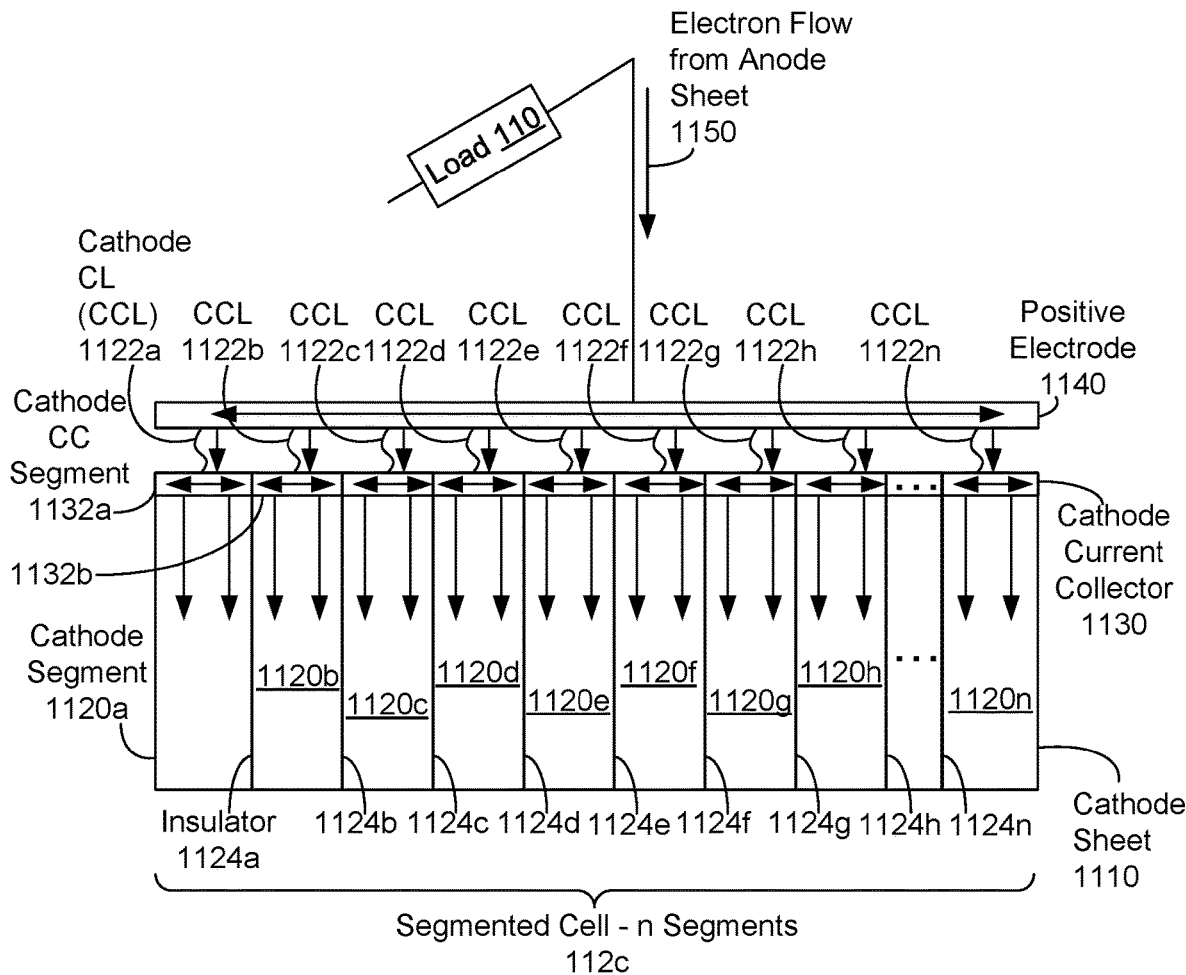
FIG. 11 is a diagram of a segmented cathode sheet and a positive electrode of the battery cell of FIG. 10, according to an example embodiment.

FIG. 11 is a diagram of segmented cathode sheet 1110 and positive electrode 1140 of battery cell 112*c*, according to an example embodiment. As indicated in FIGS. 1 and 10-13, battery cell 112*c* has n battery cell segments, n>1. In FIG. 11, the segments of cathode sheet 1110 are shown as cathode segments 1120*a*, 1120*b*, 1120*c*, 1120*d*, 1120*e*, 1120*f*, 1120*g*, 1120*h* . . . 1120*n*. The cathode segments are electrically insulated from each other by insulators 1124*a*, 1124*b*, 1124*c*, 1124*d*, 1124*e*, 1124*f*, 1124*g*, 1124*h* . . . 1124*n*. For example, cathode segment 1120*b* is electrically insulated from cathode segment 1120*a* by insulator 1124*a* and is electrically insulated from cathode segment 1120*c* by insulator 1124*b*. In some examples, insulators 1024*a*, 1024*b*, 1024*c*, 1024*d*, 1024*e*, 1024*f*, 1024*g*, 1024*h*, . . . 1024*n* can be part of the same insulator as respective insulators 1124*a*, 1124*b*, 1124*c*, 1124*d*, 1124*e*, 1124*f*, 1124*g*, 1124*h*, . . . 1124*n*; i.e., an insulator sheet (or other configuration of an insulator) can have one end separating anode segments of anode sheet 1010 and another end separating cathode segments of cathode sheet 1110, while the insulator sheet can also separate electrolyte filler layers and separators as well, thus ensuring that no electrons, ions, and/or mass flow across the insulator.

Cathode segments 1120*a*, 1120*b*, 1120*c*, 1120*d*, 1120*e*, 1120*f*, 1120*g*, 1120*h* . . . 1120*n* are connected to cathode current collector 1130, which is segmented so that each segment of cathode current collector 1130 is connected to a corresponding segment of cathode sheet 1110. Further, each segment of cathode current collector 1130 is connected to positive electrode 1140 via a cathode current limiter (CCL). For example, FIG. 11 shows that: cathode segment 1120*a* of cathode sheet 1110 is connected to cathode current collector segment 1132*a* of cathode current collector 1130, cathode current collector segment 1132*a* is also connected to cathode current limiter 1122*a*, and cathode current limiter 1122*a* is also connected to positive electrode 1140. FIG. 11 also shows that each segment of cathode current collector 1130 is electrically insulated from other cathode current collector segments by insulators 1124*a*, 1124*b*, 1124*c*, 1124*d*, 1124*e*, 1124*f*, 1124*g*, 1124*h*, . . . 1124*n*; e.g. cathode current collector segment 1132*a* is separated by insulator 1124*a* from adjacent cathode current collector segment 1132*b*.

When battery 100 is in a normal discharge mode, electrons flow from anode sheet 1010 as electron flow 1150 to positive electrode 1140. Electrons at positive electrode 1140 then flow through cathode current limiters 1122*a*, 1122*b*, 1122*c*, 1122*d*, 1122*e*, 1122*f*, 1122*g*, 1122*h*, . . . 1122*n* to the segmented cathode current collector 1130, and then from the current collector segments to cathode segments 1120*a*, 1120*b*, 1120*c*, 1120*d*, 1120*e*, 1120*f*, 1120*g*, 1120*h*, . . . 1120*n* of cathode sheet 1110. These electron flows are illustrated in FIG. 11 by arrows from electron flow 1150 from electrical load 110 to positive electrode 1140, through to cathode current limiters 1122*a* . . . 1122*n*, continuing to cathode current collector 1130, and then to cathode segments 1120*a* . . . 1120*n* of cathode sheet 1110.

A battery cell segment of battery 100, such as a segment of battery cell 112*c*, can include an anode segment of anode sheet 1010 and cathode segment of cathode sheet 1110. For example, one battery cell segment of battery 100 can include: (a) anode segment 1020*a*, anode current collector segment 1032*a*, and anode current limiter 1022*a* that is connected to negative electrode 1040, and (*b*) cathode segment 1120*a*, cathode current collector segment 1132*a*, and cathode current limiter 1122*a* that is connected to positive electrode 1140. Other example battery cell segments of battery 100 can include corresponding pairs of anode and cathode segments (e.g., anode segment 1020*b* paired with cathode segment 1120*b*), pairs of anode and cathode current collector segments (e.g., the anode current collector segment attached to anode segment 1020*b* paired with the cathode current collector segment attached to cathode segment 1120*b*, and pairs of anode and cathode current limiters (e.g., anode current limiter 1022*b* paired with cathode current limiter 1122*b*), as shown in FIGS. 10 and 11.

Note that battery 100 can include separators and electrolyte fillers as shown regarding battery cell segments 114*m*, 114*n* of FIG. 1, even though FIGS. 10-13 do not show separators and electrolyte fillers regarding battery cell 112*c*. Additionally, non-electrode components of battery cell 112*c* including, but not limited to, anode sheet 1010 and cathode sheet 1110, current collectors 1030 and 1130, current limiters 1022*a*, 1022*b*, . . . 1022*n* and 1122*a*, 1122*b* . . . 1122*n*, and any separators and electrolyte fillers, can be appropriately packaged and sealed into a container such as container 128; e.g., for use as a battery cell unit. Then electrodes of battery 100, such as negative electrode 1040 and positive electrode 1140, can be at least partially outside of the container to enable electrical connections with battery cell 112*c*.

Figure 12:
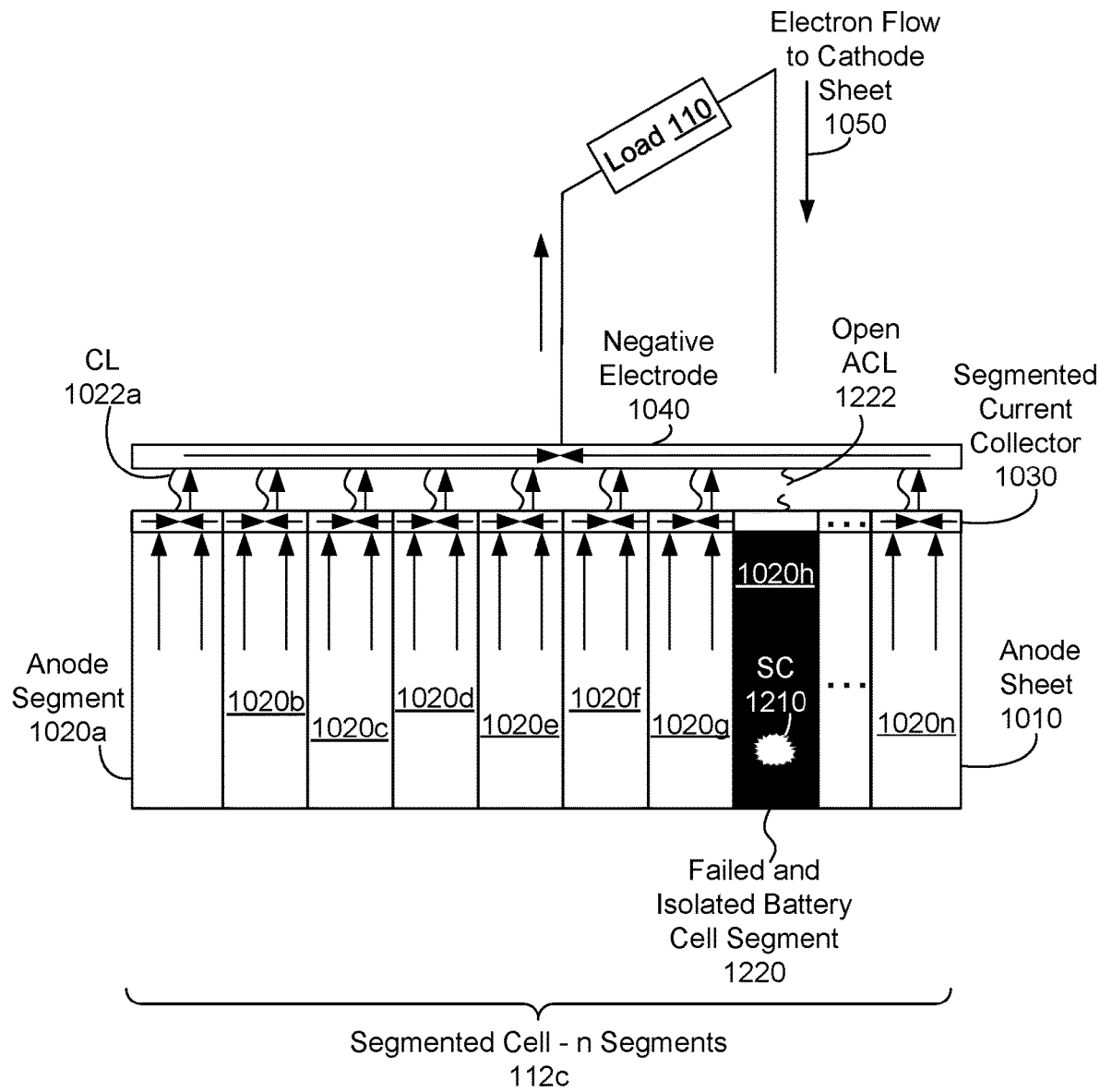
FIG. 12 is a diagram of the segmented anode sheet and the negative electrode showing an open-circuited current limiter for a failed and isolated segment of the battery cell of FIGS. 10 and 11, according to an example embodiment.

FIG. 12 is a diagram of segmented anode sheet 1010 and negative electrode 1040 showing an open anode current limiter 1222 for failed and isolated battery cell segment 1220 of battery cell 112*c*, according to an example embodiment. Open anode current limiter 1222 can include an open circuit that disables current from flowing through open anode current limiter 1222. FIG. 12 shows an example of anode sheet 1010 of battery cell 112*c* while operating in the discharge mode when an internal short circuit, shown as short channel 1210, occurs in battery cell segment 1220 that includes anode segment 1020*h*. If short channel 1210 occurs within battery cell segment 1220 while battery 100 is discharging, most, if not all, electrons flowing from anode segment 1020*h* will flow through anode current limiter 1022*h*, exceeding a maximum amount of current allowed through anode current limiter 1022*h*. Exceeding the maximum amount of current allowed can cause anode current limiter 1022*h* to open (i.e., have an open circuit) and become open anode current limiter 1222. Once anode current limiter 1022*h* opens to become open anode current limiter 1222, the open anode current limiter 1222 electrically isolates battery cell segment 1220. In the meantime, the other battery cell segments that include anode segments 1020*a*, 1020*b*, 1020*c*, 1020*d*, 1020*e*, 1020*f*, 1020*g*, and 1020*n* continue to operate normally.

Thus, the presence of short channel 1210 causes battery cell segment 1220 to fail. Further, the opening of open anode current limiter 1222 as a consequence of short channel 1210 causes battery cell segment 1220 to be electrically isolated. As such, open anode current limiter 1222 can conditionally electrically isolate battery cell segment 1220 based on an occurrence of a short circuit within battery cell segment 1220, such the occurrence of short channel 1210 in battery cell segment 1220.

Figure 13:
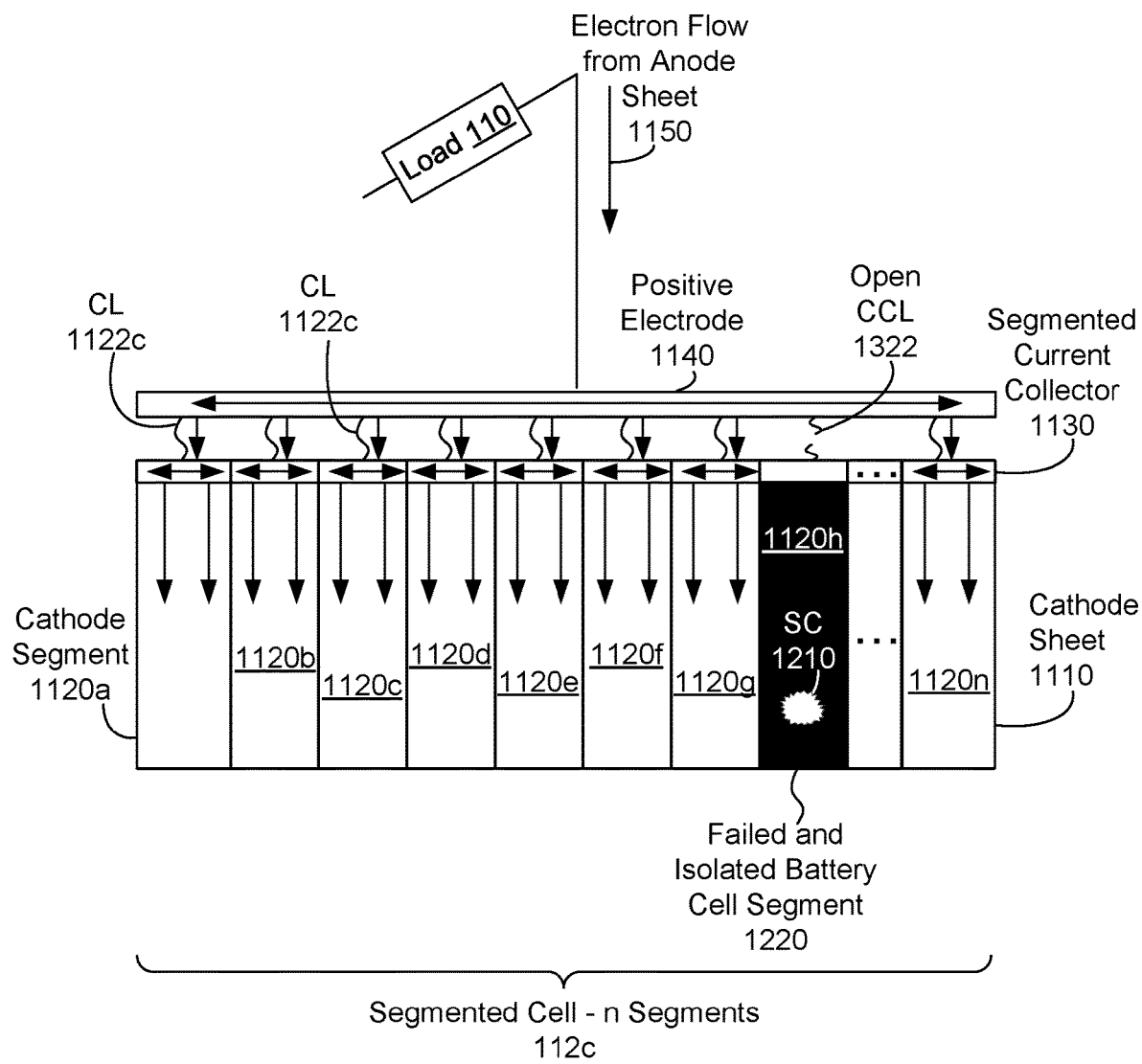
FIG. 13 is a diagram of the segmented cathode sheet and the positive electrode showing an open-circuited current limiter for a failed and isolated segment of the battery cell of FIGS. 10 and 11, according to an example embodiment.

FIG. 13 is a diagram of segmented cathode sheet 1110 and positive electrode 1140 showing an open cathode current limiter 1322 for failed and isolated battery cell segment 1220 of battery cell 112*c*, according to an example embodiment. Open cathode current limiter 1322 can include an open circuit that disables current from flowing through open cathode current limiter 1322. FIG. 13 shows an example of cathode sheet 1110 of battery cell 112*c* while operating in the discharge mode when an internal short circuit, shown as short channel 1210, occurs in battery cell segment 1220 that includes cathode segment 1120*h*. If short channel 1210 occurs within battery cell segment 1220 while battery 100 is discharging, most, if not all, electrons flowing to cathode segment 1120*h* will flow through cathode current limiter 1122*h*, exceeding a maximum amount of current allowed through cathode current limiter 1122*h*. Exceeding the maximum amount of current allowed can cause cathode current limiter 1122*h* to open and become open cathode current limiter 1322. Once cathode current limiter 1122*h* opens to become open cathode current limiter 1322, the open cathode current limiter 1322 electrically isolates battery cell segment 1220. In the meantime, the other battery cell segments that include cathode segments 1120*a*, 1120*b*, 1120*c*, 1120*d*, 1120*e*, 1120*f*, 1120*g*, and 1120*n* can continue to operate normally.

Thus, the presence of short channel 1210 causes battery cell segment 1220 to fail. Further, the opening of open anode current limiter 1322 as a consequence of short channel 1210 causes battery cell segment 1220 to be electrically isolated. As such, open cathode current limiter 1322 can conditionally electrically isolate battery cell segment 1220 based on an occurrence of a short circuit within battery cell segment 1220, such the occurrence of short channel 1210 in battery cell segment 1220.

Further, battery 100 can recover from a short channel being formed in one (or in other cases, multiple) faulty battery cell segment(s) by opening current limiters of the faulty battery cell segment(s), such as open anode current limiter 1222 and/or open cathode current limiter 1322 of battery cell segment 1220, while any non-faulty battery cell segments can continue to operate normally. As such, battery 100 likely can provide at least a limited amount of power even if a fault occurs, such as a short channel or other short circuit. Additionally, as faulty battery cell segment 1220 is electrically isolated from other battery cell segments, the likelihood that short channel 1210 will expand to other battery cell segments of battery 100 is reduced.

FIG. 14 is a flowchart of method 1400 for storing electrical power using a battery, according to an example embodiment. Method 1400 can be carried out using a segmented battery such as battery 100. Method 1400 can begin at block 1410, where a battery can store electrical power. The battery can include one or more cells. Each cell can include a plurality of battery cell segments, where each battery cell segment can include: an anode segment, a cathode segment, and one or more current limiters, such as discussed above in the context of at least FIGS. 1 and 10-13.

In some embodiments, a current limiter of the one or more current limiters can include a fuse, such as discussed above in the context of at least FIG. 1. In other embodiments, the one or more current limiters can include at least one of: a current limiter electrically connected to the anode segment and a current limiter electrically connected to the cathode segment, such as discussed above in the context of at least FIGS. 1 and 10-13.

In still other embodiments, each battery cell segment can further include one or more current collectors, such as discussed above in the context of at least FIGS. 1 and 10-13. In some of these embodiments, the one or more current collectors can include at least one of: an anode current collector electrically connected to the anode segment and a cathode current collector electrically connected to the cathode segment, such as discussed above in the context of at least FIGS. 1 and 10-13. In still other of these embodiments, a particular current collector of the one or more current collectors can be electrically connected to an electrode, such as discussed above in the context of at least FIGS. 1 and 10-13. In particular, the particular current collector can be electrically connected to the electrode using a particular current limiter of the one or more current limiters, such as discussed above in the context of at least FIGS. 1 and 10-13. In further embodiments, each battery cell segment can further include a current collector of the one or more current collectors electrically connected to a current limiter of the one or more current limiters, such as discussed above in the context of at least FIGS. 1 and 10-13. In particular, each battery cell segment can further include an anode current collector electrically connected to the anode sheet; and an anode current limiter electrically connected to the anode current collector, such as discussed above in the context of at least FIGS. 1, 10, and 12. In still further embodiments, each battery cell segment can further include a cathode current collector electrically connected to the cathode sheet and a cathode current limiter electrically connected to the cathode current collector, such as discussed above in the context of at least FIGS. 1, 11, and 13.

At block 1420, a particular battery cell segment can be conditionally electrically isolated based on an occurrence of a short circuit within the particular battery cell segment, such as discussed above in the context of at least FIGS. 1, 12, and 13.

In some embodiments, conditionally electrically isolating the particular battery cell segment can include conditionally electrically isolating the particular battery cell segment using a current limiter electrically connected to the anode segment of the particular battery cell segment, such as discussed above in the context of at least FIGS. 1 and 12.

In other embodiments, conditionally electrically isolating the particular battery cell segment can include conditionally electrically isolating the particular battery cell segment using a current limiter electrically connected to the cathode segment of the particular battery cell segment, such as discussed above in the context of at least FIGS. 1 and 13.

In further embodiments, method 1400 can further electrically isolating the particular battery cell segment from one or more other battery cell segments of the plurality of battery cell segments using one or more insulator sheets, such as discussed above in the context of at least FIGS. 1, 12, and 13.

In yet other embodiments, method 1400 can further include: electrically connecting at least two battery cell segments of the plurality of battery cell segments using one or more electrodes, such as discussed above in the context of at least FIGS. 1 and 10-13. In particular, a particular battery cell segment of the at least two battery cell segments can include at least one of: an anode current collector electrically connected to the anode segment and to a negative electrode of the one or more electrodes; and a cathode current collector electrically connected to the cathode segment and to a positive electrode of the one or more electrodes, such as discussed above in the context of at least FIGS. 1 and 10-13. In further examples, the anode current collector can be electrically connected to the negative electrode via an anode current limiter of the one or more current limiters; and the cathode current collector can be electrically connected to the positive electrode via a cathode current limiter of the one or more current limiters, such as discussed above in the context of at least FIGS. 1 and 10-13.

FIG. 15 is a flowchart of method 1500 for providing electrical power using a battery, according to an example embodiment. Method 1500 can be carried out using a segmented battery such as battery 100. Method 1500 can begin at block 1510, where a battery can provide electrical power to a load. The battery can include one or more cells. Each cell can include a plurality of battery cell segments, where each battery cell segment can include: an anode segment, a cathode segment, and one or more current limiters, such as discussed above in the context of at least FIGS. 1 and 10-13.

In some embodiments, a current limiter of the one or more current limiters can include a fuse, such as discussed above in the context of at least FIG. 1. In other embodiments, the one or more current limiters can include at least one of: a current limiter electrically connected to the anode segment and a current limiter electrically connected to the cathode segment, such as discussed above in the context of at least FIGS. 1 and 10-13.

In still other embodiments, each battery cell segment can further include one or more current collectors, such as discussed above in the context of at least FIGS. 1 and 10-13. In some of these embodiments, the one or more current collectors can include at least one of: an anode current collector electrically connected to the anode segment and a cathode current collector electrically connected to the cathode segment, such as discussed above in the context of at least FIGS. 1 and 10-13.

In further examples, a particular current collector of the one or more current collectors can be electrically connected to an electrode, such as discussed above in the context of at least FIGS. 1 and 10-13. In additional examples, the particular current collector can be electrically connected to the electrode using a particular current limiter of the one or more current limiters, such as discussed above in the context of at least FIGS. 1 and 10-13.

In further examples, each battery cell segment can further include a current collector of the one or more current collectors electrically connected to a current limiter of the one or more current limiters, such as discussed above in the context of at least FIGS. 1 and 10-13. In particular, each battery cell segment can further include an anode current collector electrically connected to the anode sheet; and an anode current limiter electrically connected to the anode current collector, such as discussed above in the context of at least FIGS. 1, 10, and 12. Each battery cell segment can further include a cathode current collector electrically connected to the cathode sheet and a cathode current limiter electrically connected to the cathode current collector, such as discussed above in the context of at least FIGS. 1, 11, and 13.

At block 1520, a particular battery cell segment can be conditionally electrically isolated based on an occurrence of a short circuit within the particular battery cell segment, such as discussed above in the context of at least FIGS. 1, 12, and 13.

In some embodiments, conditionally electrically isolating the particular battery cell segment can include conditionally electrically isolating the particular battery cell segment using one of: a current limiter electrically connected to the anode segment of the particular battery cell segment, and a current limiter electrically connected to the cathode segment of the particular battery cell segment, such as discussed above in the context of at least FIGS. 1, 12, and 13.

Disclosed embodiments are described above with reference to the accompanying drawings, in which some, but not all of the disclosed embodiments may be shown. Indeed, several different embodiments may be described and should not be construed as limited to the embodiments set forth herein. Rather, these embodiments are described so that this disclosure are thorough and complete and convey the disclosure at least to those skilled in the art.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

In addition, each block in the disclosed flowcharts may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

While various aspects and embodiments have been disclosed herein, other aspects and embodiments will be apparent to those skilled in the art.

What is claimed is:

1. A method, comprising:
   storing electrical power using a battery, the battery comprising:
     one or more cells, each cell comprising a plurality of battery cell segments, each battery cell segment comprising:
       an anode segment,
       a cathode segment, and
       one or more current limiters; and
   conditionally electrically isolating a particular battery cell segment based on an occurrence of a short circuit within the particular battery cell segment;
   electrically connecting an anode current collector in each battery cell segment to the anode segment; and
   electrically isolating the anode current collector from other anode current collector segments of other battery cell segments.

2. The method of claim 1, wherein conditionally electrically isolating the particular battery cell segment comprises conditionally electrically isolating the particular battery cell segment using a current limiter electrically connected to the anode segment of the particular battery cell segment.

3. The method of claim 1, wherein conditionally electrically isolating the particular battery cell segment comprises conditionally electrically isolating the particular battery cell segment using a current limiter electrically connected to the cathode segment of the particular battery cell segment.

4. The method of claim 1, further comprising:
   electrically isolating the particular battery cell segment from one or more other battery cell segments of the plurality of battery cell segments using one or more insulator sheets.

5. The method of claim 1, further comprising:
   electrically connecting an anode current limiter to the anode current collector.

6. The method of claim 1, wherein electrically connecting the anode current collector to the electrode comprises electrically connecting the anode current collector to the electrode using an anode current limiter.

7. The method of claim 1, further comprising:
   electrically connecting a cathode current collector in each battery cell segment to the cathode segment.

8. The method of claim 7, further comprising:
   electrically connecting a cathode current limiter in each battery cell segment to the cathode current collector.

9. The method of claim 1, further comprising:
   electrically connecting at least two battery cell segments of the plurality of battery cell segments using one or more electrodes.

10. A method, comprising:
    storing electrical power using a battery, the battery comprising:
      one or more cells, each cell comprising a plurality of battery cell segments connected using one or more electrodes, each battery cell segment comprising:
        an anode segment,
        a cathode segment, and
        one or more fuses; and
    conditionally electrically isolating a particular battery cell segment based on an occurrence of a short circuit within the particular battery cell segment.

11. The method of claim 10, wherein a particular battery cell segment of the at least two battery cell segments comprises at least one of:
    an anode current collector electrically connected to the anode segment and to a negative electrode of the one or more electrodes; and
    a cathode current collector electrically connected to the cathode segment and to a positive electrode of the one or more electrodes.

12. The method of claim 11, further comprising:
    electrically connecting the anode current collector to the negative electrode via an anode current limiter.

13. The method of claim 11, further comprising:
    electrically connecting the cathode current collector to the positive electrode via a cathode current limiter.

14. A method, comprising:
    providing electrical power to a load using a battery, the battery comprising:
      one or more cells, each cell comprising a plurality of battery cell segments, each battery cell segment comprising:
        an anode segment,
        a cathode segment,
        one or more current limiters; and
        an anode current collector electrically connected to the anode segment;
    conditionally electrically isolating a particular battery cell segment based on an occurrence of a short circuit within the particular battery cell segment; and
    electrically isolating the anode current collector from other anode current collector segments of other battery cell segments.

15. The method of claim 14, wherein conditionally electrically isolating the particular battery cell segment comprises conditionally electrically isolating the particular battery cell segment using a current limiter electrically connected to the anode segment of the particular battery cell segment.

16. The method of claim 14, wherein conditionally electrically isolating the particular battery cell segment comprises conditionally electrically isolating the particular battery cell segment using a current limiter electrically connected to the cathode segment of the particular battery cell segment.

17. A method, comprising:
  storing electrical power using a battery, the battery comprising:
    one or more cells, each cell comprising a plurality of battery cell segments, each battery cell segment comprising:
      an anode segment,
      a cathode segment, and
      one or more current limiters;
  conditionally electrically isolating a particular battery cell segment based on an occurrence of a short circuit within the particular battery cell segment; and
  electrically connecting at least two battery cell segments of the plurality of battery cell segments using one or more electrodes.

18. The method of claim 17, wherein conditionally electrically isolating the particular battery cell segment comprises conditionally electrically isolating the particular battery cell segment using a current limiter electrically connected to the anode segment of the particular battery cell segment.

19. The method of claim 17, wherein conditionally electrically isolating the particular battery cell segment comprises conditionally electrically isolating the particular battery cell segment using a current limiter electrically connected to the cathode segment of the particular battery cell segment.

20. The method of claim 17, further comprising:
  electrically isolating the particular battery cell segment from one or more other battery cell segments of the plurality of battery cell segments using one or more insulator sheets.

* * * * *